US012413943B2

(12) United States Patent
Naga et al.

(10) Patent No.: US 12,413,943 B2
(45) Date of Patent: Sep. 9, 2025

(54) VEHICLE-TO-EVERYTHING NAVIGATION SUPPORT

(71) Applicant: Harman International Industries, Incorporated, Stamford, CT (US)

(72) Inventors: Prasanna Kumar Bolisetty Yeswanth Naga, Karnataka (IN); Ramana Reddy Kodakandla, Telangana (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 119 days.

(21) Appl. No.: 17/937,379

(22) Filed: Sep. 30, 2022

(65) Prior Publication Data

US 2024/0114322 A1    Apr. 4, 2024

(51) Int. Cl.
*H04W 4/40* (2018.01)
*G01C 21/36* (2006.01)

(52) U.S. Cl.
CPC .......... *H04W 4/40* (2018.02); *G01C 21/3691* (2013.01)

(58) Field of Classification Search
CPC .............................. H04W 4/40; G01C 21/3691
See application file for complete search history.

(56) References Cited

U.S. PATENT DOCUMENTS

| | | | |
|---|---|---|---|
| 2002/0040270 A1 | 4/2002 | Kwak et al. | |
| 2012/0282876 A1* | 11/2012 | Yuasa | H04W 4/90 455/414.1 |
| 2013/0301471 A1* | 11/2013 | Brown | H04W 40/30 370/254 |
| 2016/0212610 A1* | 7/2016 | Chiba | G08G 1/096791 |
| 2022/0007145 A1 | 1/2022 | El Essaili et al. | |
| 2022/0295239 A1 | 9/2022 | Whyte et al. | |
| 2023/0057394 A1* | 2/2023 | Zhang | H04W 4/02 |

FOREIGN PATENT DOCUMENTS

| | | |
|---|---|---|
| CN | 1403988 A | 8/2001 |
| CN | 101903924 A | 12/2010 |
| CN | 102157019 A | 8/2011 |
| CN | 102256322 A | 11/2011 |
| CN | 104819721 A | 8/2015 |
| CN | 104949684 A | 9/2015 |
| WO | 2017147797 A1 | 9/2017 |

OTHER PUBLICATIONS

European Patent Office, Extended European Search Report Issued in Application No. 23195638.4, Dec. 15, 2023, Germany, 7 pages.

* cited by examiner

*Primary Examiner* — Navid Z. Mehdizadeh
*Assistant Examiner* — Matthew Ho
(74) *Attorney, Agent, or Firm* — McCoy Russell LLP

(57) ABSTRACT

A first vehicle-to-everything (V2X) device may operate in compliance with a first regional standard governing V2X Basic Safety Messages (BSMs) for a first geographical region, and a second V2X device may operate in compliance with a second regional standard governing V2X BSMs for a second geographical region. When the first V2X device is operating within the second geographical region, it may generate "global BSMs" in accordance with a multi-regional standard governing V2X BSMs. The second V2X device may process global BSMs generated by the first V2X device and may respond by generating its own global BSMs.

14 Claims, 10 Drawing Sheets

VEHICLE-TO-EVERYTHING NAVIGATION SUPPORT

FIELD

The disclosure relates to methods and systems for supporting vehicle-to-everything (V2X) based navigation.

BACKGROUND

In Vehicle-to-Everything (V2X) scenarios, a connected-vehicle automotive application, such as a communication and/or safety application, which may be executed and/or performed by an On-Board Unit (OBU), may exchange information with various other devices. For example, an OBU in one vehicle may exchange information with an OBU in another vehicle (e.g., in a Vehicle-to-Vehicle (V2V) scenario), or with a Road-Side Unit (RSU) installed along roadway infrastructure (e.g., in a Vehicle-to-Infrastructure (V2I) scenario), or with a traffic management operation centers, or with a pedestrian's mobile device (e.g., in a Vehicle-to-Pedestrian (V2P) scenario).

OBUs may semi-regularly or regularly generate and transmit Basic Safety Messages (BSMs), such as by broadcasting the BSMs. Other entities in V2X scenarios (e.g., other OBUs, or RSUs, or traffic management operation centers, or pedestrians) may receive and process the BSMs to gain information about the behavior of the vehicle carrying the OBU.

Meanwhile, an RSU may generate and transmit various types of roadside information via various RSU messages. Such messages may include mapping (MAP) messages, Signal Phase and Timing (SPaT) messages, Traveler Information Message (TIM) messages, and/or other messages. Various road-side messages may be transmitted by an RSU. An OBU may receive and process an RSU's messages and use the roadside information therein to, for example, alert a driver using the connected-vehicle automotive application.

Currently, the nature and format of BSMs may vary among geographic regions, since different standards may govern BSMs in different jurisdictions. For example, BSMs generated and transmitted by an OBU in a first vehicle that complies with a specification governing BSMs for a first geographic region may not be comprehended by an OBU in a second vehicle that complies with a specification governing BSMs for a second geographic region. Thus, if the first vehicle travels to the second geographic region, connected-vehicle applications encompassing the first vehicle (e.g., for communication and/or safety) may fail.

In addition, vehicles using a navigational automotive application may make use of navigational routes, which might not take into account certain types of conditions or events that may pertain to the navigational route. For example, an OBU of a vehicle may have information describing a navigational route between a start point and an end point. Meanwhile, an RSU whose coverage area encompasses a portion of the navigational route may have information pertaining to various conditions or events that may exist along that portion of the route, which may not have been available to the system that established the route. However, that RSU may have information pertaining merely to the portion of the route within its coverage area, which may not be sufficient information to evaluate whether the overall route is a minimum-condition or minimum-event route. Such partial information would also not be sufficient to find an alternative route that may be a minimum-condition or minimum-event route. Moreover, a vehicle attempting to coordinate with that RSU in order to establish a minimum-condition or minimum-event route may move beyond the coverage area of that RSU in the course of driving (whether the driving is along the navigational route, or along some other path).

SUMMARY

In some embodiments, the issues described above which relate to the use of an OBU outside of a region whose V2X standards it supports may be addressed by implementing a method or protocol in both a vehicle sending V2X BSMs and a vehicle receiving V2X BSMs. On the part of a vehicle operating outside its home region, a determination may be made by a first OBU (e.g., of a vehicle sending V2X BSMs) as to whether a first V2X-capable device (e.g., of the first OBU) is present within a first geographical region. A first regional standard may govern V2X BSMs for the first geographical region, which may be a "home" region for the first OBU. If it is determined that the first V2X device is present within the first geographical region, a BSM may be generated by the first OBU (e.g., in preparation for transmission), in compliance with the first regional standard governing V2X BSMs. That is, when present within its "home" region, the first V2X device may generate V2X BSMs whose formatting and/or signaling is specified by the first regional standard governing V2X BSMs.

However, if it is determined that the first V2X device is not present within the first geographical region, the first V2X device may generate a V2X BSM (e.g., in preparation for transmission), in compliance with a multi-regional standard governing V2X BSMs that is different from the first regional standard governing V2X BSMs (which may be referred to herein as a "common BSM" or a "global BSM"). That is, when the first V2X device is not present within its "home" region, the first V2X device may send global BSMs (e.g., V2X BSMs whose formatting and/or signaling is specified by the multi-regional standard governing V2X BSMs). A global BSM may include indicators that may aid a recipient in understanding various conditional parameters of the first V2X device, such as position indicators (e.g., a latitude indicator, a longitude indicator, and/or an elevation indicator) and/or vehicle dynamics indicators (e.g., a yaw rate indicator, a heading indicator, a speed indicator).

On the part of a vehicle operating within its home region, a second OBU (e.g., of a vehicle receiving V2X BSMs) may establish that a second V2X-capable device (e.g., of the second OBU) is present within a second geographical region which is different than the first geographical region. A second regional standard may govern V2X BSMs for the second geographical region, which may be a "home" region for the second OBU, and the second regional standard governing V2X BSMs may be different than the first regional standard governing V2X BSMs. For example, the first regional standard may define formatting (e.g., message formatting and/or logical formatting) and/or signaling (e.g., physical-layer and/or wireless-transmission characteristics) for V2X BSMs that is different than formatting and/or signaling for V2X BSMs as defined by the second regional standard.

Upon establishing that the second V2X device is present within the second geographical region, the second V2X device may monitor for global V2X BSMs. Upon detecting and/or otherwise processing a global V2X BSM, the second V2X device may respond by generating its own V2X BSM in compliance with the multi-regional standard governing V2X BSMs. That is, when the second V2X device is in its "home" region, and when it receives a global BSM, the second V2X device may send its own global BSM.

In this way, by being able to send and receive V2X BSMs in compliance with a standard that encompasses multiple regions, an OBU (and a vehicle incorporating the OBU) may be able to exchange data typically carried by BSMs, even if the OBU is in a region in which the formatting and/or signaling of V2X BSMs are governed by a standard that the OBU does not normally comply with in its "home" region.

In some embodiments, the issues described above which relate to the establishment of a minimum-condition or minimum-event navigational route may be addressed by implementing a method for establishing a minimum-event navigational route. A request may be made—e.g., by an OBU, of an RSU—to evaluate whether a navigational route is a minimum-event navigational route between a start point of the navigational route. (e.g., within a coverage region of the RSU) and an end point of the navigational route. The RSU may request confirmation from one or more centralized processors of whether the navigational route is a minimum-event navigational route between the start point and the end point. The centralized processors may be in communication with RSUs having coverage areas encompassing parts of, or entireties of, a plurality of potential navigational routes between the start point and the end point. Based upon that communication, the centralized processors may either confirm that the navigational route is a minimum-event route, or may provide a suggested alternative navigational route. The RSU may then forward to the OBU either the confirmation, or the provided alternative navigational route, which the OBU may retain even after it has exited the RSU's coverage area. In this way, the OBU may coordinate with an RSU to establish a minimum-condition or minimum-event navigational route between a start point and an end point, even though the RSU may lack information about conditions and/or events along various potential routes between the start point and the end point, and even if the OBU moves beyond the RSU's coverage area, and is therefore no longer able to coordinate with the RSU.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 9:
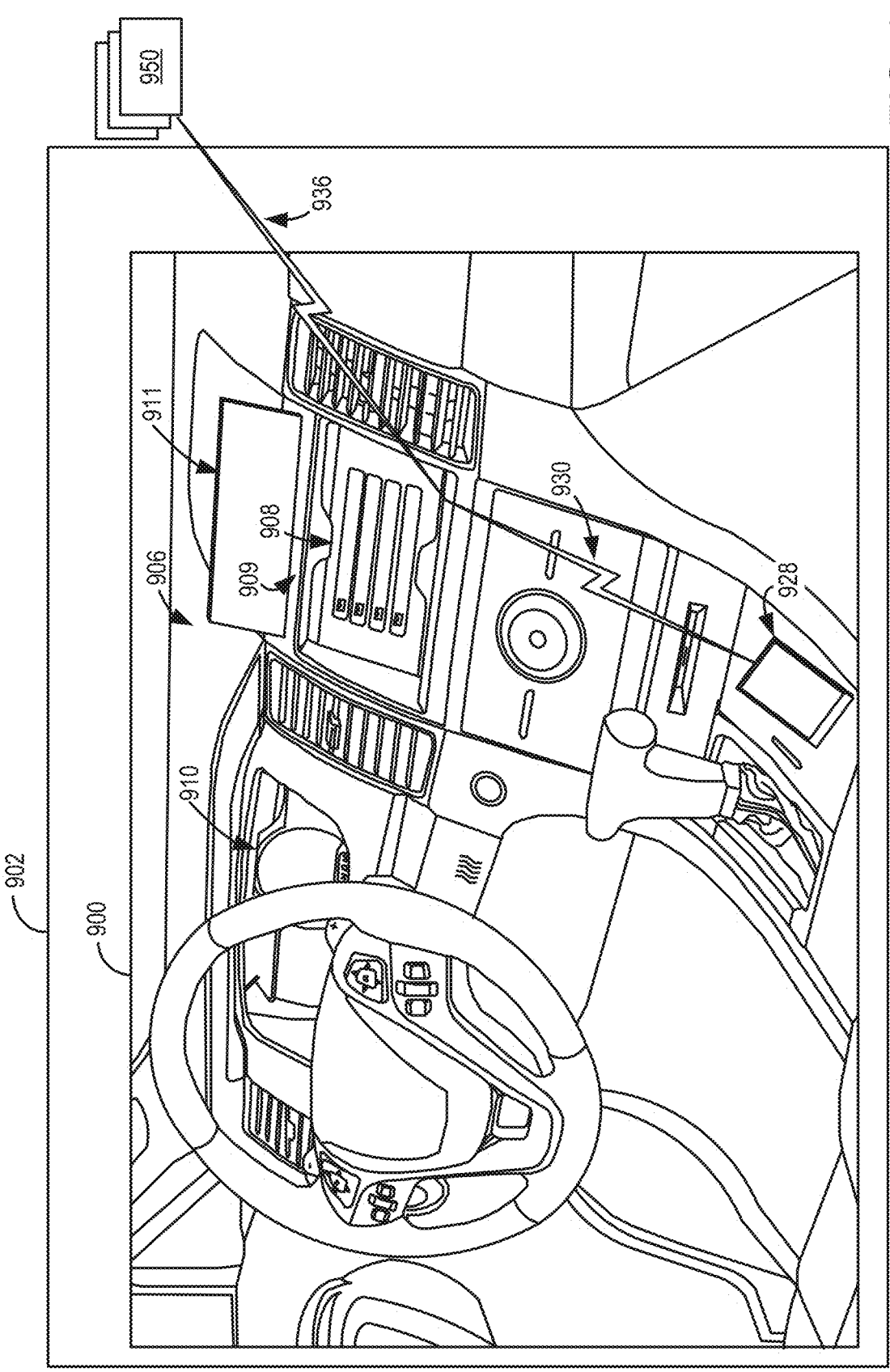
FIG. 9 shows an example partial view of an interior of a cabin of a vehicle, in accordance with one or more embodiments of the present disclosure.
Figure 10:
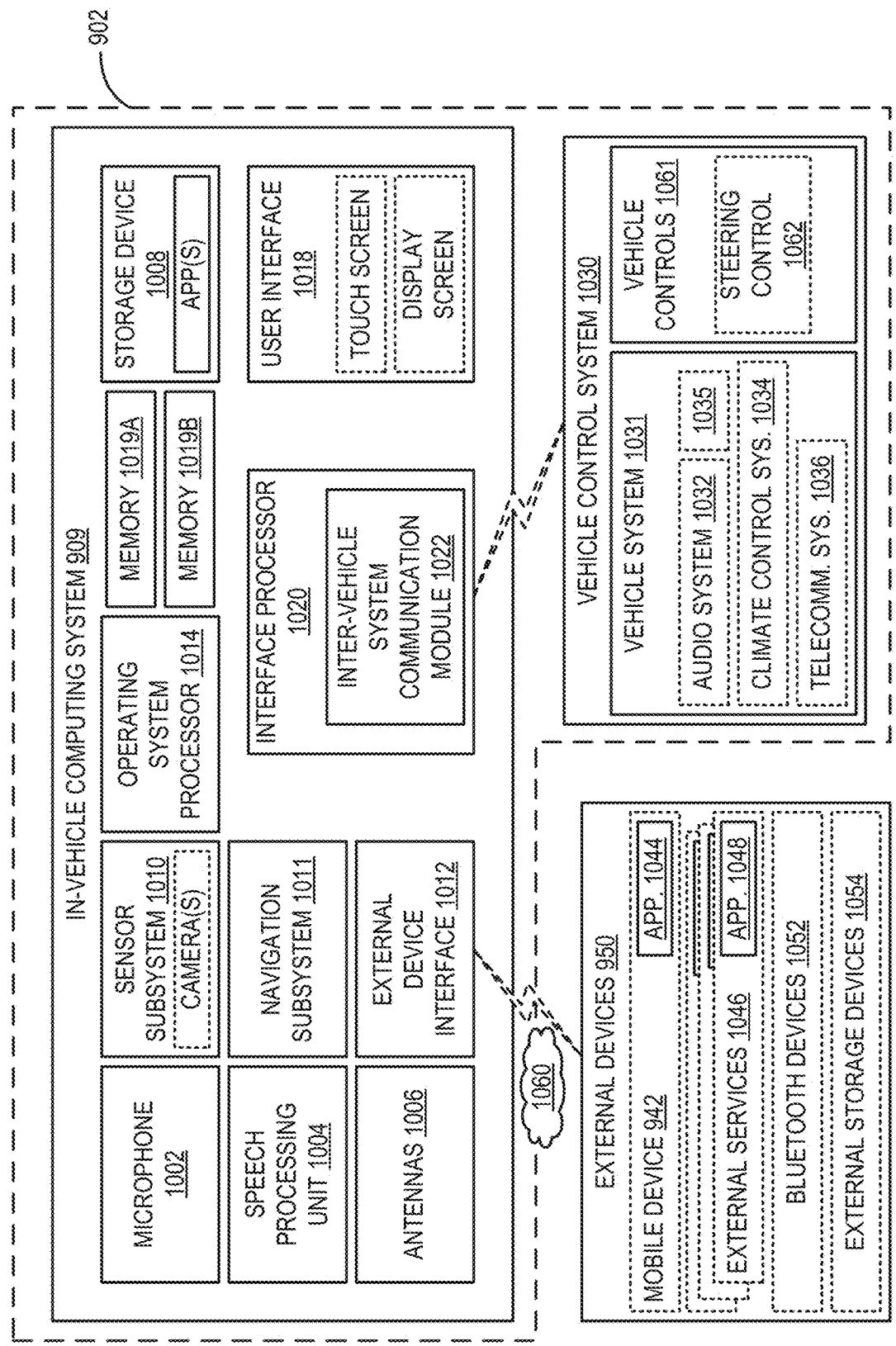
FIG. 10 shows a block diagram of an in-vehicle computing system or infotainment system configured and/or integrated inside the vehicle of FIG. 9, in accordance with one or more embodiments of the present disclosure.

In this disclosure, FIGS. 1, 2, 6, and 7 relate to mechanisms and methods for using Vehicle-to-Everything (V2X) compliant On-Board Units (OBUs) outside of regions whose V2X standards the OBUs support. FIGS. 3-5 and 8 relate to mechanisms and methods for establishing minimum-condition or minimum-event navigational routes. FIGS. 9 and 10 relate to vehicles that may implement the various mechanisms and methods disclosed herein.

Figure 1:
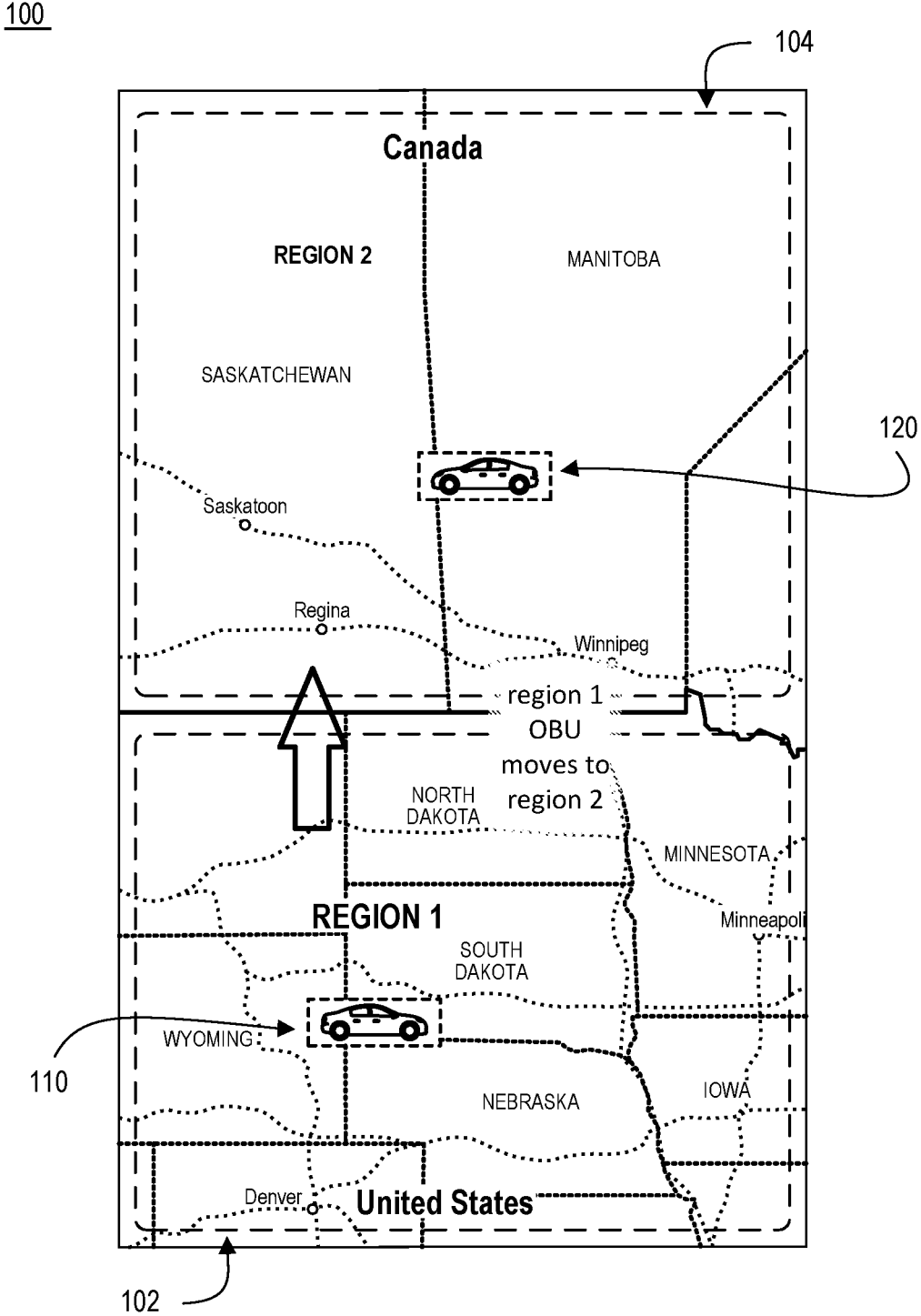
FIG. 1 shows a scenario leading to exchange of global BSMs in accordance with one or more embodiments of the present disclosure.

FIG. 1 shows a scenario 100 leading to an exchange of global BSMs. In scenario 100, a first vehicle 110 is operating within a first geographical region 102, and a second vehicle 120 is operating within a second geographical region 104. First vehicle 110 may carry a first OBU including a first V2X device, and second vehicle 120 may carry a second OBU including a second V2X device. The first V2X device (of first vehicle 110) may implement various V2X functionality, including generation of and processing of V2X BSMs, in compliance with a first V2X standard that has been adopted for use within the first geographical region. Similarly, the second V2X device (of second vehicle 120) may implement various V2X functionality, including generation of and processing of V2X BSMs, in compliance with a second V2X standard that has been adopted for use within the second geographical region.

In scenario 100, first vehicle 110 transitions to second geographical region 104. It may thereafter be advantageous for first vehicle 110 to exchange V2X BSMs with second vehicle 120, in order for first vehicle 110 to carry out V2X-based automotive applications within second region 104, and in order for second vehicle 120 to benefit from the participation of first vehicle 110 in V2X-based automotive applications within second region 104. However, the first V2X standard specifies formatting and/or signaling for V2X BSMs that is different from the formatting and/or signaling for V2X BSMs that is specified by the second V2X standard. As a result, V2X BSMs that are generated and transmitted by first vehicle 110, in the course of first vehicle 110 complying with the first V2X standard, may not be received and/or processed by second vehicle 120, in the course of second vehicle 120 complying with the second V2X standard. Instead, in the course of first vehicle 110 complying with the first regional standard and second vehicle 120 complying with the second regional standard, second vehicle 120 is unable to receive and process V2X BSMs that are generated and transmitted by first vehicle 110 (and vice versa). Connected-vehicle automotive applications among first vehicle 110 and second vehicle 120 may thereafter lack sufficient information to operate as desired.

Figure 2:
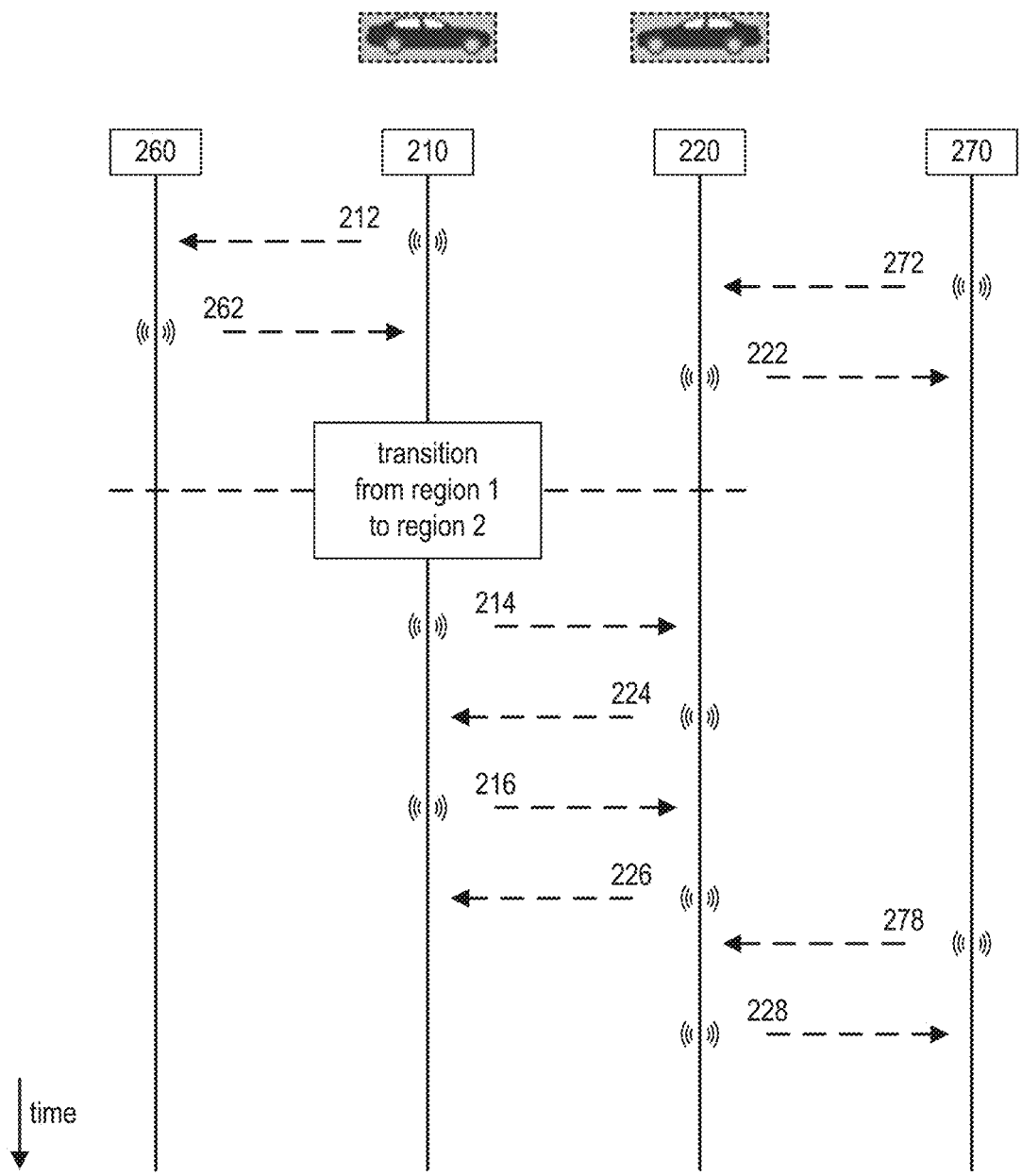
FIG. 2 shows a scenario including the exchange of global BSMs in accordance with one or more embodiments of the present disclosure.

This is further depicted in FIG. 2, which shows a scenario 200 including the exchange of global BSMs. (Initial portions of scenario 200 may be substantially similar to scenario 100.) In scenario 200, a first vehicle 210 and one or more other vehicles 260 may in a first geographical region. At a part 212, first vehicle 210 may generate and transmit V2X BSMs in compliance with a first regional standard governing V2X BSMs, and vehicles 260 may receive and process those V2X BSMs in compliance with the first regional standard. Then, at a part 262, vehicles 260 may generate and transmit V2X BSMs in compliance with the first regional standard, and first vehicle 210 may receive and process those V2X BSMs in compliance with the first regional standard.

Meanwhile, second vehicle 220 and or more other vehicles 270 may be in a second geographical region. At a part 272, vehicles 270 may generate and transmit V2X BSMs in compliance with a second regional standard governing V2X BSMs, and second vehicle 220 may receive and process V2X BSMs in compliance with the second regional standard. Then, at a part 222, second vehicle 220 may generate and transmit V2X BSMs in compliance with the second regional standard governing V2X BSMs, and vehicles 270 may receive and process those V2X BSMs in compliance with the second regional standard.

At some point, first vehicle 210 moves from the first geographical region to the second geographical region. First vehicle 210 may detect or otherwise determine that it is no longer present within the first geographical region. For example, first vehicle 210 may maintain a map of the first region, with coordinates of the boundaries of the first geographic region (e.g., a geofence). First vehicle 210 may then obtain coordinate data, such as latitude and longitude information—e.g., from a Global Navigation Satellite System (GNSS) such as the Global Positioning System (GPS)—and may compare the coordinate data to the boundaries of the first geographic region to determine whether first vehicle 210 is within the first geographic region.

If first vehicle 210 determines that it is beyond or otherwise outside of the first geographical region, first vehicle 210 may generate and transmit global BSMs (e.g., V2X BSMs in compliance with a multi-regional standard governing V2X BSMs). For example, at a part 214, first vehicle 210 may generate and transmit global BSMs (e.g., V2X BSMs in compliance with the multi-regional standard governing V2X BSMs), and second vehicle 220 may receive and process those global BSMs.

The way in which the multi-regional standard defines or otherwise governs V2X BSMs may be different from the way in which the first regional standard and/or the second regional standard defines or otherwise governs V2X BSMs. In some embodiments, the various standards may define different formats, e.g., of the fields of bits and/or sets of bits that comprise the BSM. For some embodiments, the various standards may define different signaling requirements, e.g., of the radio circuitry and/or other analog wireless-transmission circuitry. In various embodiments, the various standards may define different frequency ranges for BSMs and/or bandwidth ranges for BSMs.

Second vehicle 220 may generate and transmit its own global BSMs in response to the global BSMs generated by first vehicle 210. Second vehicle 220 may provide such global BSMs as a courtesy to first vehicle 210. Accordingly, in various embodiments, second vehicle 220 may be disposed to generate and transmit these global BSMs at a rate that is significantly less than a rate at which second vehicle 220 may be disposed to generate and transmit V2X BSMs in compliance with the second regional standard governing V2X BSMs. For example, at a part 224, in response to receiving and processing global BSMs, second vehicle 220 may generate and transmit global BSMs at about one-tenth the rate at which second vehicle 220 may generate and transmit V2X BSMs in compliance with the second regional standard governing V2X BSMs (e.g., at a rate of approximately one every second, as opposed to a rate of approximately one every 100 milliseconds (ms)). First vehicle 210 may then receive and process such global BSMs. In various embodiments, a relative rate at which global BSMs are sent may be a function of current traffic conditions. For example, the relative rate of sending global BSMs for the benefit of vehicles traveling outside their home region may be reduced if V2X radio or signaling conditions are heavy, and/or if V2X communication is otherwise heavy.

By exchanging global BSMs, OBUs in first vehicle 210 and second vehicle 220 may advantageously communicate various vehicular parameters with each other (e.g., safety-related parameters). The exchange of global BSMs may advantageously enable or facilitate desired operation of connected-vehicle automotive applications among first vehicle 210 and/or second vehicle 220.

Moreover, in some embodiments, once first vehicle 210 has received and processed global BSMs from second vehicle 220—and is thereby informed that second vehicle 220 can provide global BSMs—first vehicle 210 may request that second vehicle 220 forward information provided to second vehicle 220 by one or more nearby RSUs. Such RSU information may further facilitate the desired operation of connected-vehicle automotive applications among first vehicle 210 and/or second vehicle 220. For example, at a part 216, first vehicle 210 may generate and transmit one or more global BSMs that include an indicator for requesting local RSU information, and second vehicle 220 may receive and process those global BSMs.

Then, at a part 226, second vehicle 220 may generate and transmit global BSMs that carry local RSU information, and first vehicle 210 may receive and process those global BSMs (and local RSU information they may carry). For example, second vehicle 220 may generate and transmit global BSMs that carry traffic light information, signal information, speed information, mapping (MAP) message information, Signal Phase and Timing (SPaT) message information, and/or Traveler Information Message (TIM) message information. In various embodiments, the global BSMs generated by second vehicle 220 at part 226 may carry information it has received from one or more local RSUs. In various embodiments, the local RSU information may accordingly contain information describing the geography of an intersection (e.g., the number of lanes, speed limits on individual lanes), the signaling of an intersection (e.g., the time left in a phase of traffic signaling), and/or information regarding special events on a roadway (e.g., coordinates pertaining to a path leading to an event and/or speed limits). The provision of local RSU information may advantageously further enable or facilitate desired operation of connected-vehicle automotive applications among first vehicle 210 and/or second vehicle 220.

In some embodiments, a local RSU itself may comply with the multi-regional standard governing provision of V2X BSMs, and upon detecting first vehicle 210, the local RSU may directly supply global BSMs, including global BSMs carrying local RSU information.

Meanwhile, second vehicle 220 may continue its normal V2X operation for the second geographical region. For example, at a part 278, vehicles 270 may transmit may generate and transmit V2X BSMs in compliance with a second regional standard governing V2X BSMs, and second vehicle 220 may receive and process V2X BSMs in compliance with the second regional standard (as at part 272). Then, at a part 228, second vehicle 220 may generate and transmit V2X BSMs in compliance with the second regional standard governing V2X BSMs, and vehicles 270 may receive and process those V2X BSMs in compliance with the second regional standard (as at part 222). Accordingly, the methods disclosed herein may enable and/or facilitate V2X based coordination with vehicles traveling out of their home regions while still promoting V2X based coordination between vehicles within their home regions.

In various embodiments, the standard adopted for use within the first geographical region and/or the standard adopted for use within the second geographical region may be a wireless local area network (WLAN) based V2X standard. Alternatively, in various embodiments, the standard adopted for use within the first geographical region and/or the standard adopted for use within the second geographical region may be a cellular V2X (C-V2X) based V2X standard. For various embodiments, the standard adopted for use within the first geographical region and/or the standard adopted for use within the second geographical region may be a standard promulgated by the Institute of Electrical and Electronics Engineers (IEEE), the European Telecommunications Standards Institute (ETSI), the Association of Radio Industries and Businesses (ARIB), the Telecommunication Technology Association (TTA), the 3rd Generation Partnership Project (3GPP), or any other institution that promulgates and/or adopts standards for one or more geographical regions. Example standards that may apply could include: standards from the SAE (formerly, the Society of Automotive Engineers); standards from regional SAE organizations, such as China SAE (CSAE), Japan SAE (JSAE), and so on; and Open Radio Access Network (ORAN) standards.

Figure 3:
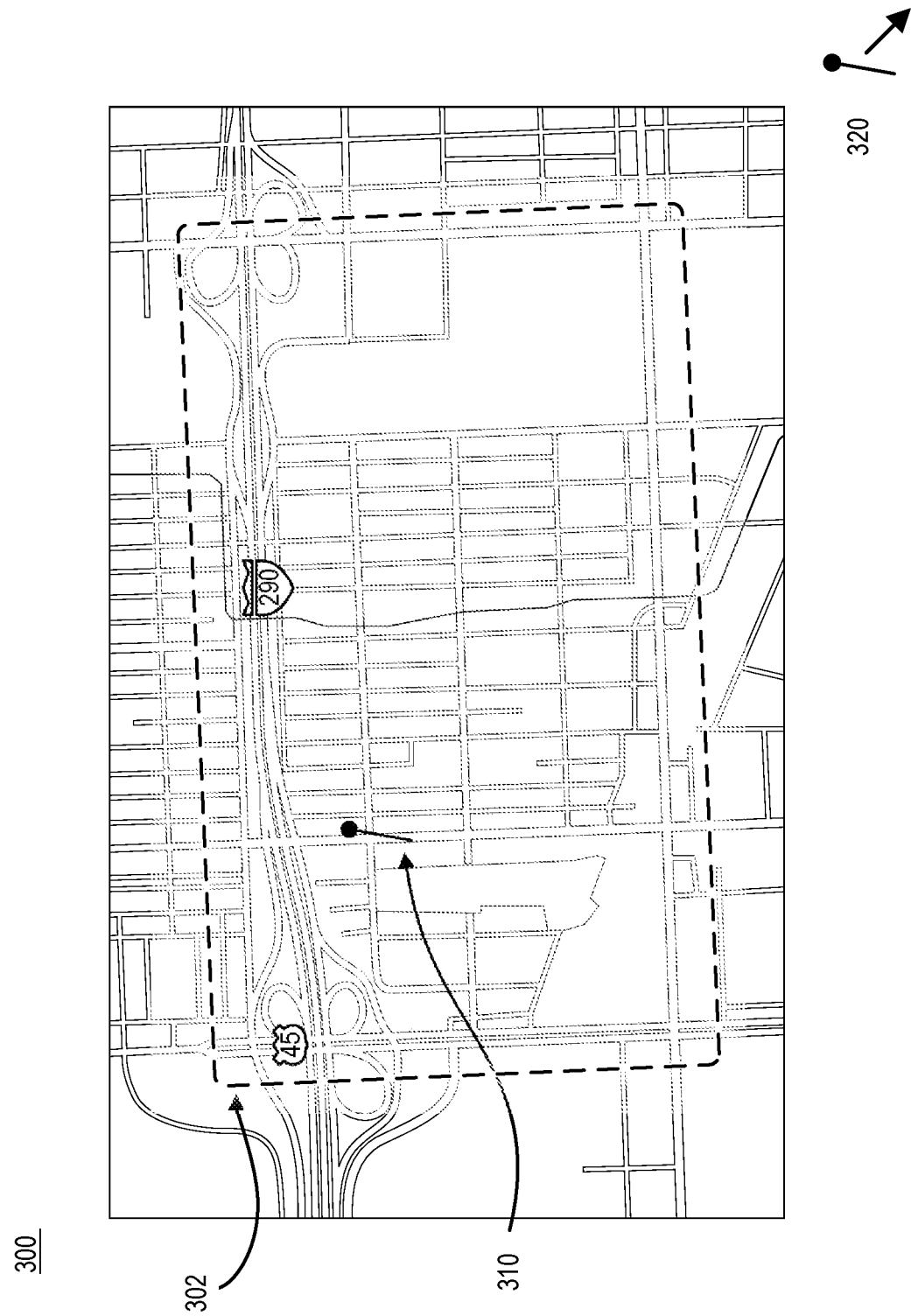
FIG. 3 shows a partial view of a scenario of navigating from a first location to a second location in accordance with one or more embodiments of the present disclosure.

FIG. 3 shows a partial view 300 of a scenario of navigating from a first location to a second location. View 300 may depict a portion of a geographical area between a first location 310 and a second location 320 (which lies outside of the depicted portion of the geographical area). View 300 may represent, for example, part or all of a geographical area in which a navigational device of a vehicle may be operable to provide potential navigational routes, such as potential navigational routes between first location 310 and second location 320.

An RSU may be present within the portion of the geographical area depicted by view 300, and the RSU may have a coverage area 302 encompassing first location 310, but not encompassing second location 320. Coverage area 302 may accordingly encompass merely portions of one or more potential navigational routes between first location 310 and second location 320.

The navigational device of the vehicle may seek to coordinate with the RSU to determine whether a particular navigational route between first location 310 and second location 320—outside of coverage area 302—is a navigational route having a minimum number of conditions and/or events among a set of potential navigational routes between first location 310 and second location 320. In some embodiments, the conditions and/or events may reflect factors impacting safety, such as incidents of hard braking, indicators of accidents, collision warnings, emergency warnings, reports of criminal activity, and/or triggering of safety-related applications.

Figure 4:
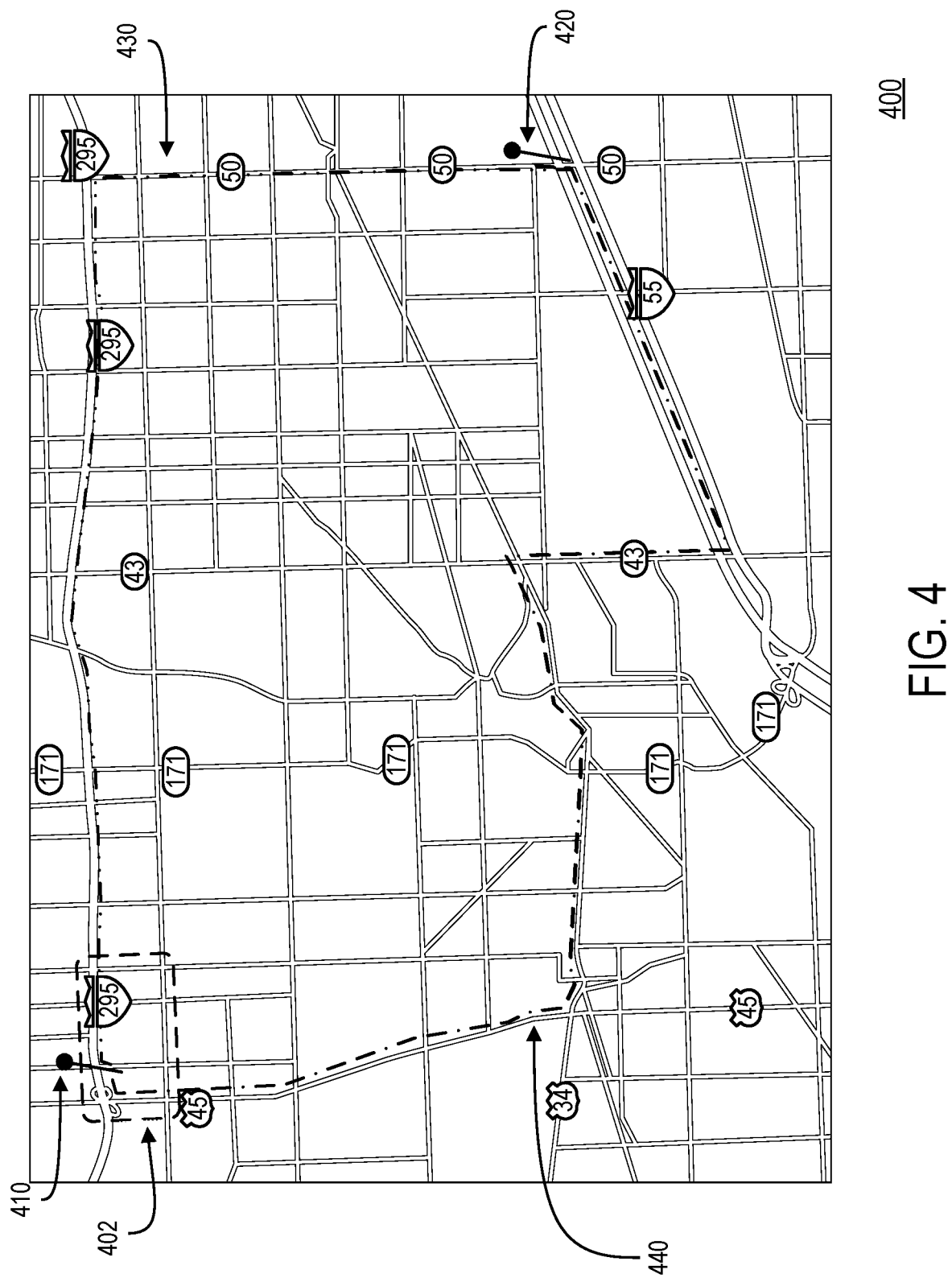
FIG. 4 shows a more complete view of the scenario of navigating from the first location to the second location in accordance with one or more embodiments of the present disclosure.

FIG. 4 shows a more complete view 400 of the scenario of navigating from the first location to the second location. View 400 may depict a geographical area between a first location 410, which may be substantially similar to first location 310, and a second location 420, which may be substantially similar to second location 320. View 400 may therefore depict substantially an entirety of the geographical area depicted by view 300.

Accordingly, the RSU that is present within the portion of the geographical area depicted by view 300 may also be present within the geographical area depicted by view 400. The RSU may have a coverage area 402 (which may be substantially similar to coverage area 302) encompassing first location 410, but not encompassing second location 420. However, more RSUs may be present within the geographical area depicted by view 400. In various embodiments, a plurality of RSUs may be present within the geographical area depicted by view 400, and their coverage areas (including coverage area 402) may collectively encompass more extensive portions of potential navigational routes between first location 410 and second location 420, up to and including entire navigational routes (subject to the distribution of operational RSUs within the geographical area of view 400).

Accordingly, a vehicle may use a navigational device to establish a first potential navigational route 430 between first location 410 and second location 420. A user of the vehicle (which may be a human operator, or an agent of a self-driving system) may seek to determine whether first potential navigational route 430 is a route that includes a minimum number of events among a plurality of potential navigational routes between first location 410 and second location 420, e.g., a minimum-event route. The vehicle may be near first location 410, and an OBU of the vehicle may seek to coordinate with the RSU associated with coverage area 402 to establish a minimum-event route.

That RSU may in turn coordinate with centralized processing resources with which it is in communication, and those centralized processing resources may in turn be in communication with one or more other RSUs. The centralized processing resources may evaluate first potential navigational route 430, then either confirm to the RSU that first potential navigational route 430 is a minimum-event route, or suggest to the RSU a second potential navigational route 440 as a minimum-event route (as is discussed further below with respect to FIG. 5). The RSU may either confirm to the OBU that first potential navigational route 430 is a minimum-event route, or provide second potential navigational route 440 to the OBU, which may notify the user (e.g., the human operator or agent of the self-driving system) of the results.

Figure 5:
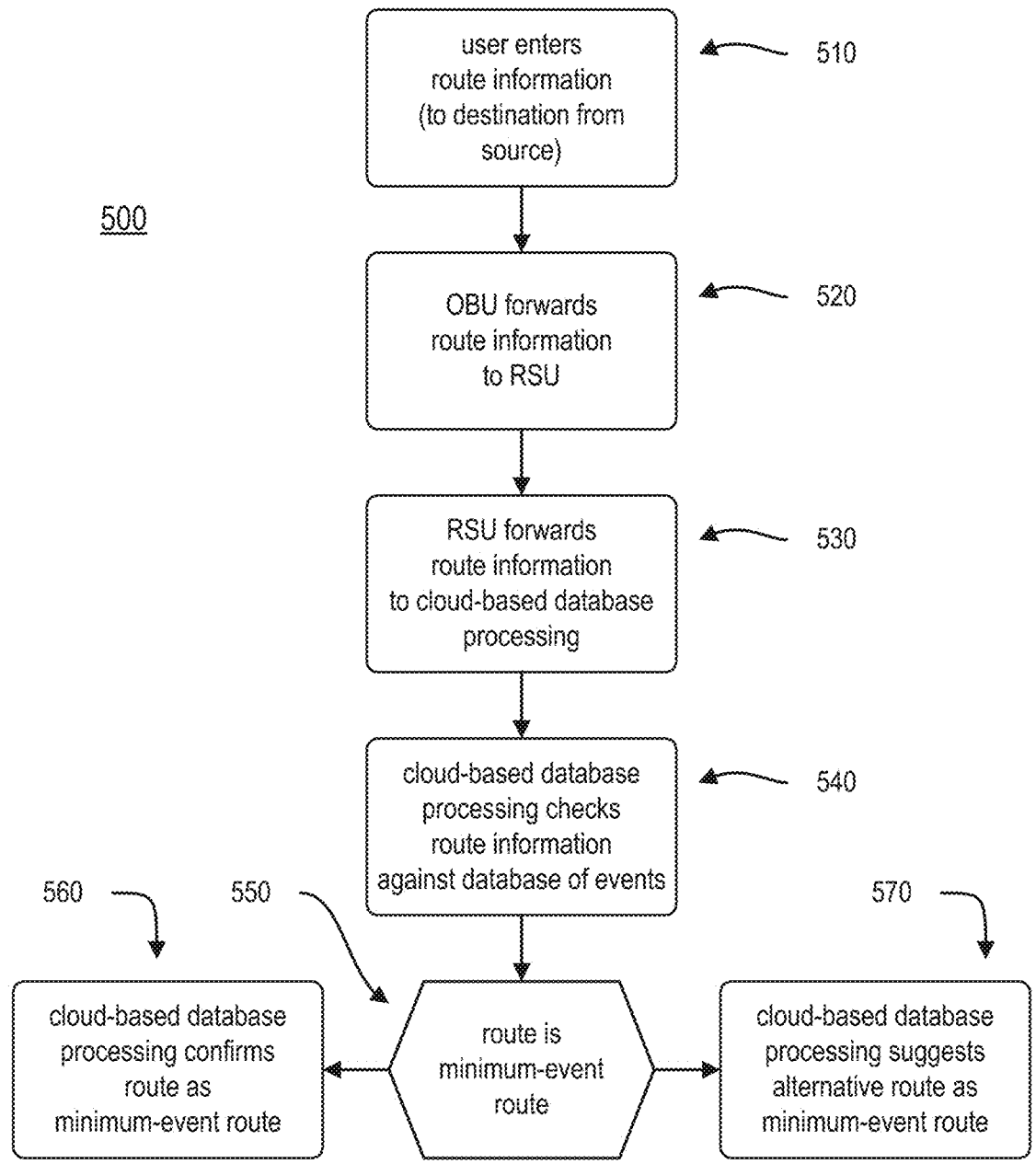
FIG. 5 shows a protocol for establishing a minimum-event navigational route between a first location and a second location, in accordance with one or more embodiments of the present disclosure.

FIG. 5 shows a protocol 500 for establishing a minimum-event navigational route between a first location and a second location. A user may undertake protocol 500. The user may be a human operator, or an agent of a self-driving system (e.g., a portion of the self-driving system operable to provide output to and accept input from entities outside of the self-driving system).

At a part 510, the user may enter information for a navigational route (which may be substantially similar to first potential navigational route 430). The navigational route may extend from a first location (e.g., a start point or source, such as first location 410) to a second location (e.g., an end point or destination, such as second location 420).

The information may comprise information describing points along the navigational route and/or segments along the navigational route. In various embodiments, the information may collectively describe encompass an entirety of the navigational route between the first location and the second location. The user may provide this information to a navigational device, e.g., by entering it via a touch-screen interface or other interface, for human operators, or by accepting it as part of a transmission from an agent of a self-driving system. The navigational device may provide the information for the navigational route to an OBU.

At a part 520, the OBU may forward the information describing the navigational route to an RSU. The RSU may encompass a portion of one or more potential navigational routes extending between the first location and the second location (such as coverage area 402). The RSU may be one of a plurality of RSUs having coverage areas encompassing portions of potential navigational routes between the first location and the second location.

At a part 530, the RSU may forward the information describing the navigational route to centralized computing resources in communication with the plurality of RSUs. For example, the centralized computing resources may comprise cloud-based database processing resources.

At a part 540, the centralized computing resources may check the navigational route described by the information against a database of conditions and/or events. For example, the centralized computing resources may directly query a centralized database of conditions and/or events, which may be accumulated in the course of communicating with the RSU, as well as with other RSUs of the plurality of RSUs. Alternatively, in some embodiments, the centralized computing resources may query a database of conditions and/or events at least a portion of which is available within the RSUs of the plurality of RSUs.

In various embodiments, at part 540, the centralized computing resources may also identify one or more other potential navigational routes to check between the first location and the second location. In some embodiments, the other potential navigational routes may be provided to the centralized computing resources by an RSU (e.g., the RSU with which the user had initially interacted). For some embodiments, the other potential navigational routes may be determined by the centralized computing resources themselves.

At a part 550, the centralized computing resources may determine based on the query whether the navigational route is a minimum-event navigational route. For example, if the centralized computing resources have determined that there are no conditions or events associated with the navigational route, or that a number of conditions or events associated with the navigational route is fewer than a threshold number of conditions or events, then the centralized computing resources may determine that the navigational route is a minimum-event navigational route. If the centralized computing resources have determined that the navigational route is a minimum-event navigational route—and if the centralized computing resources have not identified any other potential navigational routes between the first location and the second location that have not been checked—then protocol 500 may proceed to a part 560; otherwise, protocol 500 may proceed to a part 570.

At part 560, the centralized computing resources may confirm the navigational route as a minimum-event navigational route to the RSU. In turn, the RSU may confirm that the navigational route is a minimum-event navigational route to the OBU, and the OBU may confirm that the navigational route is a minimum-event navigational route to the user.

At part 570, the centralized computing resources may check the other potential navigational routes against the database of conditions and/or events to determine a number of conditions and/or events associated with each potential navigational route, and may identify which of the other potential navigational routes is associated with the fewest conditions and/or events. The number of conditions and/or events associated with that identified potential navigational route may be compared against the number of conditions and/or events associated with the navigational route provided by the RSU.

In that comparison, if the navigational route provided by the RSU is associated with fewer conditions and/or events, the centralized computing resources may confirm the navigational route as a minimum-event navigational route to the RSU. Otherwise, the centralized computing resources may provide information describing the identified potential navigational route (e.g., the other potential navigational route associated with the fewest conditions and/or events) to the RSU. In various embodiments (as discussed further herein), the potential navigational route may be shown on a display of a navigational system, such as a self-driving system, for example in a high-definition view map (or any other geographical representation).

Figure 6:
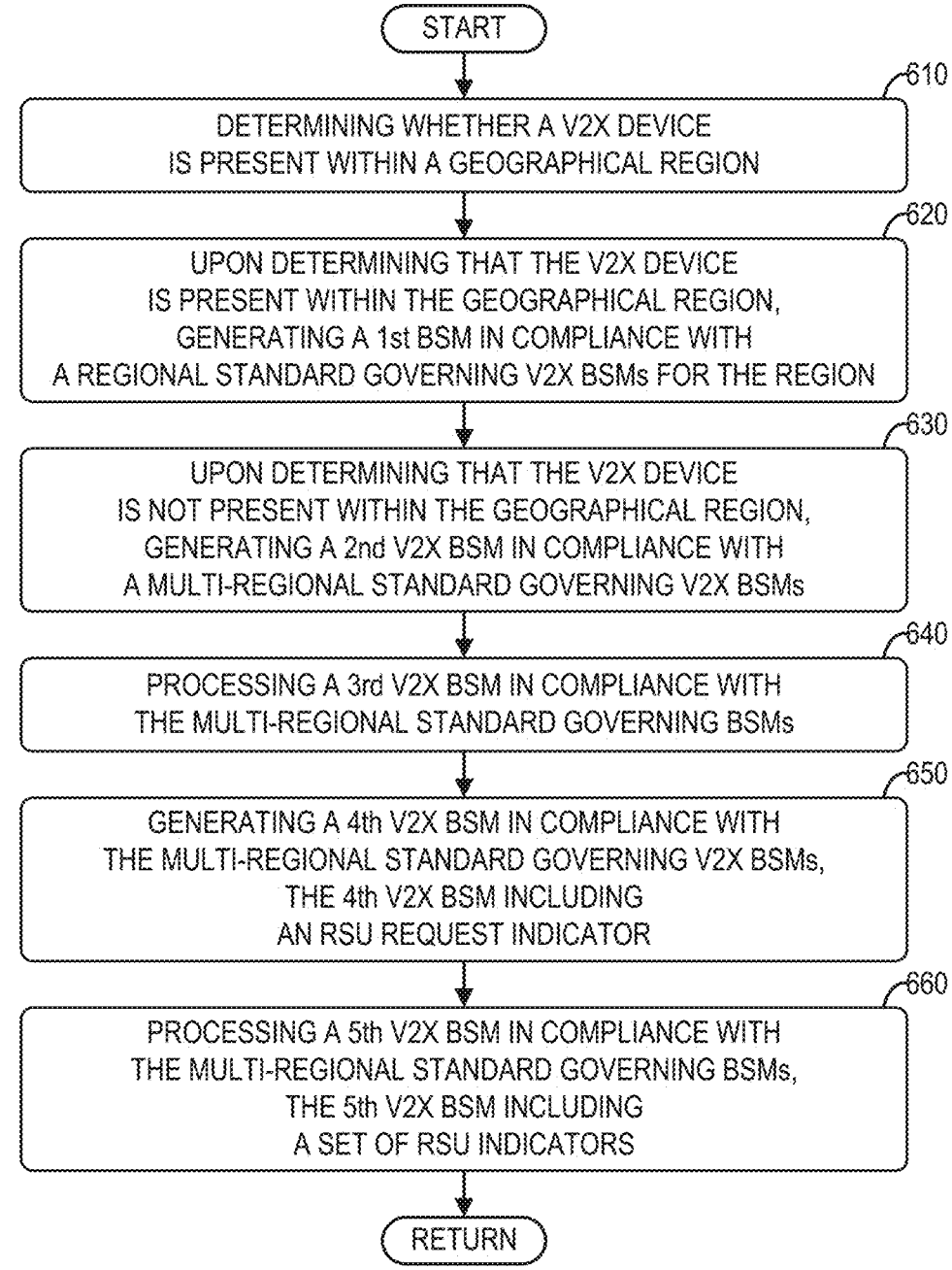
FIG. 6 shows a method of using global BSMs on the part of a vehicle operating outside its home region, in accordance with one or more embodiments of the present disclosure.

FIG. 6 shows a method of using global BSMs on the part of a vehicle operating outside its home region, such as in portions of FIG. 1 pertinent to first vehicle 110 and portions of FIG. 2 pertaining to first vehicle 210. A method 600 may comprise a determining 610, a generating 620, and a generating 630. In various embodiments, method 600 may comprise a processing 640, a generating 650, and/or a processing 660.

In determining 610, it may be determined whether a V2X device is present within a geographical region (such as by first vehicle 210 in FIG. 2). Upon determining that the V2X device is present within the geographical region, in generating 620, a first BSM may be generated in compliance with a regional standard governing V2X BSMs for the geographical region (such as at part 212). Upon determining that the V2X device is not present within the geographical region, in generating 630, a second V2X BSM in compliance with a multi-regional standard governing V2X BSMs may be generated (such as at part 214). The multi-regional standard may be different than the regional standard governing V2X BSMs (e.g., the multi-regional standard may be a different standard than the regional standard, and/or may define or otherwise govern V2X BSMs differently than the regional standard).

In some embodiments, the multi-regional standard governing V2X BSMs may establish a V2X BSM format including a set of position indicators and a set of vehicle dynamics indicators. For some embodiments, the set of position indicators may include includes a latitude indicator, a longitude indicator, and/or an elevation indicator, and the set of vehicle dynamics indicators may include a speed indicator, a heading indicator, a brake-light status indicator, an indicator-light status indicator, a brake status indicator, a yaw rate indicator, and/or an emergency-light status indicator.

For some embodiments, at processing 640, a third V2X BSM may be processed in compliance with the multi-regional standard governing BSMs (such as at part 224). In some embodiments, at generating 650, in response to processing the third V2X BSM in compliance with the multi-regional standard governing V2X BSMs, a fourth V2X BSM may be generated in compliance with the multi-regional standard governing V2X BSMs (such as at part 216), and the fourth V2X BSM may include a local RSU request indicator. For some embodiments, at processing 660, a fifth V2X BSM may be processed in compliance with the multi-regional standard governing BSMs (such as at part 226), and the fifth V2X BSM may include a set of RSU indicators. In various embodiments, the set of RSU indicators may include a traffic light indicator, a signal indicator, a speed indicator, a MAP message indicator, a SPaT message indicator, and/or a TIM message indicator.

In some embodiments, a frequency range specified for V2X BSMs in compliance with the regional standard governing V2X BSMs mat be different from the frequency range specified for V2X BSMs in compliance with the multi-regional standard governing V2X BSMs. For some embodiments, a bandwidth range specified for V2X BSMs in compliance with the regional standard governing V2X BSMs may be different from a bandwidth range specified for V2X BSMs in compliance with the multi-regional standard governing V2X BSMs.

Figure 7:
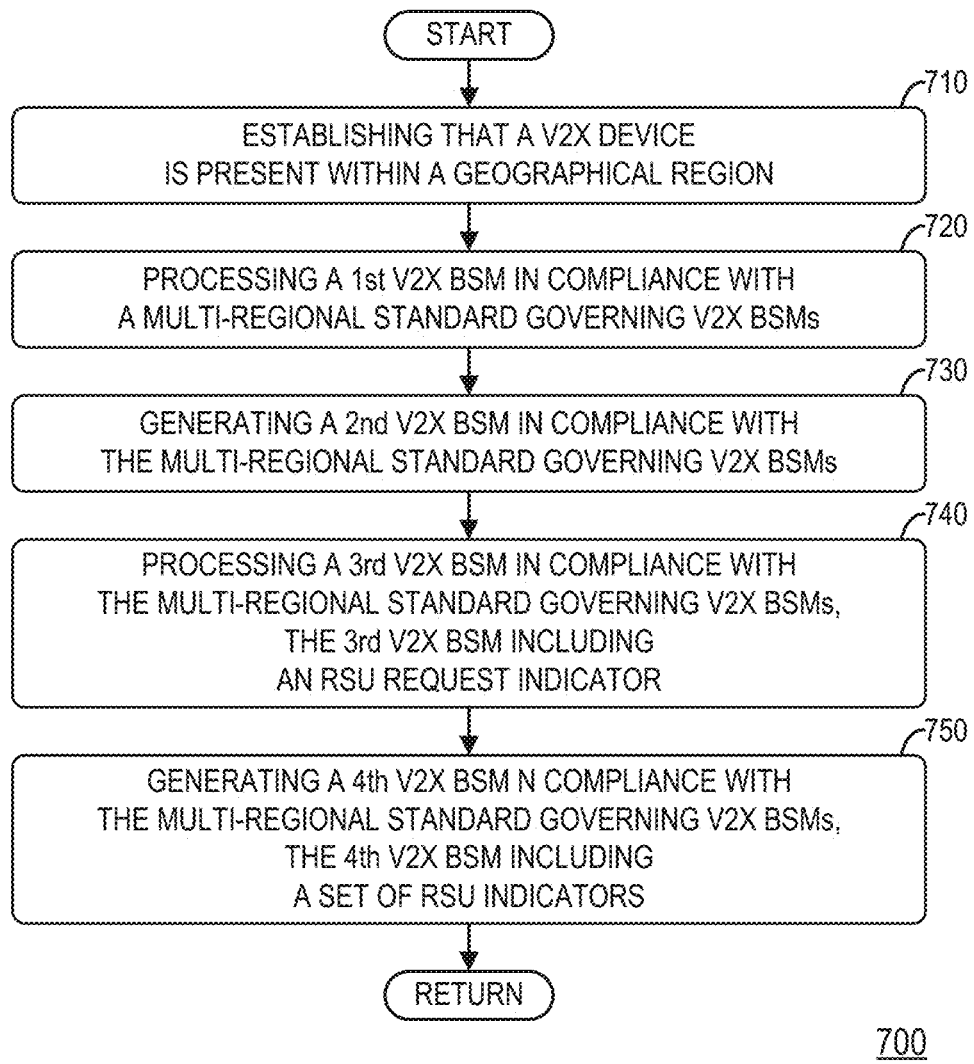
FIG. 7 shows a method of supporting global BSMs on the part of a vehicle operating within its home region, in accordance with one or more embodiments of the present disclosure.

FIG. 7 shows a method of supporting global BSMs on the part of a vehicle operating within its home region, such as in portions of FIG. 1 pertinent to second vehicle 120 and portions of FIG. 2 pertaining to second vehicle 220. A method 700 may comprise an establishing 710, a processing 720, and a generating 730. In various embodiments, method 700 may also comprise a processing 740 and/or a generating 750.

In establishing 710, a V2X device may be established as being present within a geographical region (such as by second vehicle 220 in FIG. 2). In processing 720, a first V2X BSM may be processed in compliance with a multi-regional standard governing V2X BSMs (such as at part 214). The multi-regional standard governing V2X BSMs may be different than a regional standard governing V2X BSMs for the geographical region (e.g., the multi-regional standard may be a different standard than the regional standard, and/or may define or otherwise govern V2X BSMs differently than the regional standard). In generating 730, in response to processing the first V2X BSM in compliance with the multi-regional standard governing V2X BSMs, a second V2X BSM may be generated in compliance with the multi-regional standard governing V2X BSMs (such as at part 224).

In some embodiments, a frequency for generating V2X BSM in compliance with the multi-regional standard governing V2X BSMs may be less than a frequency for generating V2X BSM in compliance with the regional standard governing V2X BSMs. For some embodiments, the V2X device may be installed in a vehicle (e.g., in an OBU of the vehicle), while in other embodiments, the V2X device may be installed in an RSU.

For some embodiments, the multi-regional standard governing V2X BSMs may establish a V2X BSM format including a set of position indicators and a set of vehicle dynamics indicators. In some embodiments, the set of position indicators may include includes a latitude indicator, a longitude indicator, and/or an elevation indicator, and the set of vehicle dynamics indicators may include a speed indicator, a heading indicator, a brake-light status indicator, an indicator-light status indicator, a brake status indicator, a yaw rate indicator, and/or an emergency-light status indicator.

In some embodiments, in processing 740, a third V2X BSM may be processed in compliance with the multi-regional standard governing V2X BSMs (such as at part 216). The third V2X BSM may include a local RSU request indicator. For some embodiments, in response to processing the local RSU request indicator, at generating 750, a fourth V2X BSM may be generated in compliance with the multi-regional standard governing V2X BSMs (such as at part 226). The fourth V2X BSM may include a set of RSU indicators, which may in turn include a traffic light indicator, a signal indicator, a speed indicator, a MAP message indicator, a SPaT message indicator, and/or a TIM message indicator.

Figure 8:
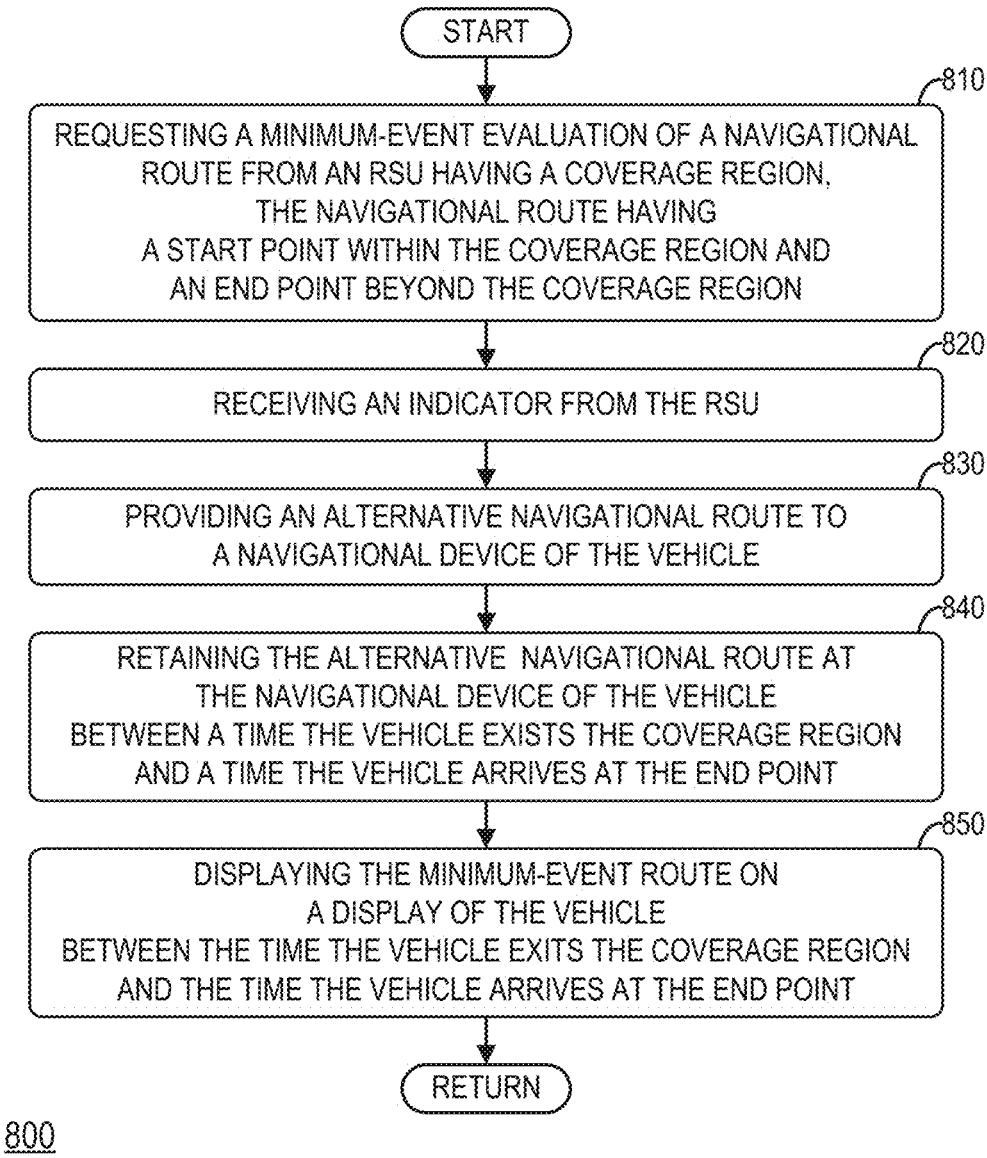
FIG. 8 shows a method of establishing a minimum-condition or minimum event navigational route.

FIG. 8 shows a method of establishing a minimum-condition or minimum-event navigational route, such as with respect to view 300 of FIG. 3 and view 400 of FIG. 4. A method 800 may comprise a requesting 810, a receiving 820, a providing 830, and a retaining 840. In various embodiments, method 800 may comprise a displaying 850.

In requesting 810, a minimum-event evaluation of a navigational route may be requested from an RSU having a coverage area (such as coverage area 302 or coverage area 402). The navigational route may be requested by an OBU. The navigational route may have a start point within the coverage region (such as first location 310 or first location 410) and an end point beyond the coverage region (such as second location 320 or second location 420). In receiving 820, an indicator may be received from the RSU (e.g., by the OBU) carrying a confirmation that the navigational route is a minimum-event navigational route, or a suggested alternative navigational route. In receiving 830, if the indicator carries an alternative navigational route, the suggested alternative navigational route may be provided (e.g., by the OBU) to a navigational device of the vehicle. In retaining 840, if the indicator carries the alternative navigational route, the suggested alternative navigational route may be retained at the navigational device of the vehicle between a time the vehicle exists the coverage region and a time the vehicle arrives at the end point. In various embodiments, the alternative navigational route may be a minimum-event route between the start point and the end point.

In some embodiments, in displaying 850, if the indicator carries the alternative navigational route, the navigational route may be displayed on a display of the vehicle between the time the vehicle exits the coverage region and the time the vehicle arrives at the end point. For some embodiments, the events of the minimum-event may route include events reported through BSMs (e.g., to centralized computing resources) for a plurality of available routes between the start point and the end point. In some embodiments, the events of the minimum-event route may encompass reported collisions for the plurality of available routes, and/or reported criminal activity for the plurality of available routes.

For some embodiments, the RSU may be in communication with one or more centralized processors for serving minimum-event routes for vehicle navigation, and the one or more centralized processors in turn may be in communication with a plurality of additional RSUs. The RSU may receive the alternative navigational route from the one or more centralized processors.

Method 600, method 700, and/or method 800 may be configured for the operation of the systems disclosed herein. Thus, the same advantages that apply to the systems may apply to the methods.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously.

Note that the example control and estimation routines included herein can be used with various system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of a computer readable storage medium, where the described actions are carried out by executing the instructions in a system including the various hardware components in combination with the electronic controller.

FIG. 9 shows an example partial view of an interior of a cabin 900 of a vehicle 902, in which a driver and/or one or more passengers may be seated. Vehicle 902 may be a road automobile, among other types of vehicles. Vehicle 902 may be a motor vehicle including an internal combustion engine. In some examples, vehicle 902 may include a hybrid propulsion system including an energy conversion device operable to absorb energy from vehicle motion and/or the engine and convert the absorbed energy to an energy form suitable for storage by an energy storage device. Vehicle 902 may also include a fully electric propulsion system, incorporating fuel cells, solar energy capturing elements, and/or other energy storage systems for powering the vehicle.

As shown, an instrument panel 906 may include various displays and controls accessible to a human driver (also referred to as the user) of vehicle 902. For example, instrument panel 906 may include a touch screen 908 of an in-vehicle computing system or infotainment system 909 (e.g., an infotainment system), an audio system control panel, and an instrument cluster 910. Touch screen 908 may receive user input to in-vehicle computing system or infotainment system 909 for controlling audio output, visual display output, user preferences, control parameter selection, and so on.

In some embodiments, one or more hardware elements of in-vehicle computing system or infotainment system 909, such as touch screen 908, a display screen 911 (which may be a display showing maps, e.g. navigational maps, whether high-definition or more conventional and/or lesser resolution), various control dials, knobs and buttons, memory, processor(s), and any interface elements (e.g., connectors or ports) may form an integrated head unit that is installed in instrument panel 906 of the vehicle. The head unit may be fixedly or removably attached in instrument panel 906. In additional or alternative embodiments, one or more hardware elements of in-vehicle computing system or infotainment system 909 may be modular and may be installed in multiple locations of the vehicle.

Cabin 900 may include one or more sensors for monitoring the vehicle, the user, and/or the environment. For example, cabin 900 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in cabin 900, and so on. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, and so on. Information regarding ambient conditions of the vehicle, vehicle status, or vehicle driver may also be received from sensors external to/separate from the vehicle (that is, not part of the vehicle system), such as sensors coupled to external devices 950 and/or mobile device 928.

Cabin 900 may also include one or more user objects, such as mobile device 928, that are stored in the vehicle before, during, and/or after travelling. Mobile device 928 may include a smart phone, a tablet, a laptop computer, a portable media player, and/or any suitable mobile computing device. Mobile device 928 may be connected to in-vehicle computing system via a communication link 930. Communication link 930 may be wired (e.g., via Universal Serial Bus (USB), Mobile High-Definition Link (MHL), High-Definition Multimedia Interface (HDMI), Ethernet, and so on) or wireless (e.g., via Bluetooth®, Wi-Fi®, Wi-Fi Direct®, Near-Field Communication (NFC), cellular connectivity, and so on) and configured to provide two-way communication between the mobile device and the in-vehicle computing system. (Bluetooth® is a registered trademark of Bluetooth SIG, Inc., Kirkland, WA. Wi-Fi® and Wi-Fi Direct® are registered trademarks of Wi-Fi Alliance, Austin, Texas.) Mobile device 928 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, communication link 930 may provide sensor and/or control signals from various vehicle systems (such as vehicle audio system, climate control system, and so on) and touch screen 908 to mobile device 928 and may provide control and/or display signals from mobile device 928 to the in-vehicle systems and touch screen 908. Communication link 930 may also provide power to mobile device 928 from an in-vehicle power source in order to charge an internal battery of the mobile device.

In-vehicle computing system or infotainment system 909 may also be communicatively coupled to additional devices operated and/or accessed by the user but located external to vehicle 902, such as one or more external devices 950. In the depicted embodiment, external devices are located outside of vehicle 902 though it will be appreciated that in alternate embodiments, external devices may be located inside cabin 900. The external devices may include a server computing system, personal computing system, portable electronic device, electronic wrist band, electronic head band, portable music player, electronic activity tracking device, pedometer, smart-watch, GPS system, and so on. External devices 950 may be connected to the in-vehicle computing system via a communication link 936 which may be wired or wireless, as discussed with reference to communication link 930, and configured to provide two-way communication between the external devices and the in-vehicle computing system. For example, external devices 950 may include one or more sensors and communication link 936 may transmit sensor output from external devices 950 to in-vehicle computing system or infotainment system 909 and touch screen 908. External devices 950 may also store and/or receive information regarding contextual data, user behavior/preferences, operating rules, and so on and may transmit such information from external devices 950 to in-vehicle computing system or infotainment system 909 and touch screen 908.

In-vehicle computing system or infotainment system 909 may analyze the input received from external devices 950, mobile device 928, and/or other input sources and select settings for various in-vehicle systems (such as climate control system or audio system), provide output via touch screen 908 and/or speakers 912, communicate with mobile device 928 and/or external devices 950, and/or perform other actions based on the assessment. In some embodiments, all or a portion of the assessment may be performed by mobile device 928 and/or external devices 950.

In some embodiments, one or more of external devices 950 may be communicatively coupled to in-vehicle computing system or infotainment system 909 indirectly, via mobile device 928 and/or another of external devices 950. For example, communication link 936 may communicatively couple external devices 950 to mobile device 928 such that output from external devices 950 is relayed to mobile device 928. Data received from external devices 950 may then be aggregated at mobile device 928 with data collected by mobile device 928, the aggregated data then transmitted to in-vehicle computing system or infotainment system 909 and touch screen 908 via communication link 930. Similar data aggregation may occur at a server system and then transmitted to in-vehicle computing system or infotainment system 909 and touch screen 908 via communication link 936 and/or communication link 930.

In various embodiments, portions of in-vehicle computing system or infotainment system 909, and/or portions of an integrated head unit of vehicle 902, may implement a V2X device, an OBU, and/or a navigational device of the sort contemplated by FIGS. 1-8. External devices 950 may comprise V2X devices, OBUs, and/or navigational devices of other vehicles, and in-vehicle computing system or infotainment system 909 may communicate with such devices through communication link 936.

FIG. 10 shows a block diagram of an in-vehicle computing system or infotainment system 909 configured and/or integrated inside vehicle 902. In-vehicle computing system or infotainment system 909 may perform one or more of the methods described herein in some embodiments. In some examples, in-vehicle computing system or infotainment system 909 may be a vehicle infotainment system configured to provide information-based media content (audio and/or visual media content, including entertainment content, navigational services, and so on) to a vehicle user to enhance the operator's in-vehicle experience. In-vehicle computing system or infotainment system 909 may include, or be coupled to, various vehicle systems, sub-systems, hardware components, as well as software applications and systems that are integrated in, or integratable into, vehicle 902 in order to enhance an in-vehicle experience for a driver and/or a passenger.

In-vehicle computing system or infotainment system 909 may include one or more processors including an operating system processor 1014 and an interface processor 1020. Operating system processor 1014 may execute an operating system on in-vehicle computing system or infotainment system 909, and control input/output, display, playback, and other operations of In-vehicle computing system or infotainment system 909. Interface processor 1020 may interface with a vehicle control system 1030 via an inter-vehicle system communication module 1022.

Inter-vehicle system communication module 1022 may output data to one or more other vehicle systems 1031 and/or one or more other vehicle control elements 1061, while also receiving data input from other vehicle systems 1031 and other vehicle control elements 1061, e.g., by way of vehicle control system 1030. When outputting data, inter-vehicle system communication module 1022 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System (GPS) sensors, and so on), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle). For example, in-vehicle computing system or infotainment system 909 may retrieve from the engine CAN bus the current speed of the vehicle estimated by the wheel sensors, a power state of the vehicle via a battery and/or power distribution system of the vehicle, an ignition state of the vehicle, and so on. In addition, other interfacing means such as Ethernet may be used as well without departing from the scope of this disclosure.

A storage device 1008 may be included in in-vehicle computing system or infotainment system 909 to store data such as instructions executable by operating system processor 1014 and/or interface processor 1020 in non-volatile form. Storage device 1008 may store application data, including prerecorded sounds, to enable in-vehicle computing system or infotainment system 909 to run an application for connecting to a cloud-based server and/or collecting information for transmission to the cloud-based server. The application may retrieve information gathered by vehicle systems/sensors, input devices (e.g., a user interface 1018), data stored in one or more storage devices, such as a volatile memory 1019A or a non-volatile memory 1019B, devices in communication with the in-vehicle computing system (e.g., a mobile device connected via a Bluetooth® link), and so on. (Bluetooth® is a registered trademark of Bluetooth SIG, Inc., Kirkland, WA.) In-vehicle computing system or infotainment system 909 may further include a volatile memory 1019A. Volatile memory 1019A may be random access memory (RAM). Non-transitory storage devices, such as non-volatile storage device 1008 and/or non-volatile memory 1019B, may store instructions and/or code that, when executed by a processor (e.g., operating system processor 1014 and/or interface processor 1020), controls in-vehicle computing system or infotainment system 909 to perform one or more of the actions described in the disclosure.

In various embodiments, one or more processors of vehicle 902 (which may include, e.g., operating system processor 1014 and/or interface processor 1020) may execute instructions (stored, e.g., on storage device 1008, in volatile memory 1019A, and/or in non-volatile memory 1019B) to perform the various methods and protocols discussed herein, including method 600, method 700, and method 800. In some embodiments, such processors and memory may accordingly implement one or more of an OBU, a V2X device, and/or a navigational device, as discussed herein.

A microphone 1002 may be included in in-vehicle computing system or infotainment system 909 to receive voice commands from a user, to measure ambient noise in the vehicle, to determine whether audio from speakers of the vehicle is tuned in accordance with an acoustic environment of the vehicle, and so on. A speech processing unit 1004 may process voice commands, such as the voice commands received from microphone 1002. In some embodiments, in-vehicle computing system or infotainment system 909 may also be able to receive voice commands and sample ambient vehicle noise using a microphone included in an audio system 1032 of the vehicle.

One or more additional sensors may be included in a sensor subsystem 1010 of in-vehicle computing system or infotainment system 909. For example, sensor subsystem 1010 may include a camera, such as a rear view camera for assisting a user in parking the vehicle and/or a cabin camera for identifying a user (e.g., using facial recognition and/or user gestures). Sensor subsystem 1010 of in-vehicle computing system or infotainment system 909 may communicate with and receive inputs from various vehicle sensors and may further receive user inputs. For example, the inputs received by sensor subsystem 1010 may include transmission gear position, transmission clutch position, gas pedal input, brake input, transmission selector position, vehicle speed, engine speed, mass airflow through the engine, ambient temperature, intake air temperature, and so on, as well as inputs from climate control system sensors (such as heat transfer fluid temperature, antifreeze temperature, fan speed, passenger compartment temperature, desired passenger compartment temperature, ambient humidity, and so on), an audio sensor detecting voice commands issued by a user, a fob sensor receiving commands from and optionally tracking the geographic location/proximity of a fob of the vehicle, and so on.

While certain vehicle system sensors may communicate with sensor subsystem 1010 alone, other sensors may communicate with both sensor subsystem 1010 and vehicle control system 1030, or may communicate with sensor subsystem 1010 indirectly via vehicle control system 1030. A navigation subsystem 1011 of in-vehicle computing system or infotainment system 909 may generate and/or receive navigation information such as location information (e.g., via a GPS sensor and/or other sensors from sensor subsystem 1010), route guidance, traffic information, point-of-interest (POI) identification, and/or provide other navigational services for the driver.

An external device interface 1012 of in-vehicle computing system or infotainment system 909 may be coupleable to and/or communicate with one or more external devices 950 located external to vehicle 902. While the external devices are illustrated as being located external to vehicle 902, it is to be understood that they may be temporarily housed in vehicle 902, such as when the user is operating the external devices while operating vehicle 902. In other words, external devices 950 are not integral to vehicle 902. External devices 950 may include a mobile device 928 (e.g., connected via a Bluetooth®, NFC, WI-FI Direct®, or other wireless connection) or an alternate Bluetooth®-enabled device 1052. (Wi-Fi Direct® is a registered trademark of Wi-Fi Alliance, Austin, Texas.)

Mobile device 928 may be a mobile phone, smart phone, wearable devices/sensors that may communicate with the in-vehicle computing system via wired and/or wireless communication, or other portable electronic device(s). Other external devices include one or more external services 1046. For example, the external devices may include extra-vehicular devices that are separate from and located externally to the vehicle. Still other external devices include one or more external storage devices 1054, such as solid-state drives, pen drives, Universal Serial Bus (USB) drives, and so on. External devices 950 may communicate with in-vehicle computing system or infotainment system 909 either wirelessly or via connectors without departing from the scope of this disclosure. For example, external devices 950 may communicate with in-vehicle computing system or infotainment system 909 through external device interface 1012 over a network 1060, a USB connection, a direct wired connection, a direct wireless connection, and/or other communication link.

External device interface 1012 may provide a communication interface to enable the in-vehicle computing system to communicate with mobile devices associated with contacts of the driver. For example, external device interface 1012 may enable phone calls to be established and/or text messages (e.g., Short Message Service (SMS), Multimedia Message Service (MMS), and so on) to be sent (e.g., via a cellular communications network) to a mobile device associated with a contact of the driver. External device interface 1012 may additionally or alternatively provide a wireless communication interface to enable the in-vehicle computing system to synchronize data with one or more devices in the vehicle (e.g., the driver's mobile device) via Wi-Fi Direct®, as described in more detail below.

One or more applications 1044 may be operable on mobile device 928. As an example, a mobile device application 1044 may be operated to aggregate user data regarding interactions of the user with the mobile device. For example, mobile device application 1044 may aggregate data regarding music playlists listened to by the user on the mobile device, telephone call logs (including a frequency and duration of telephone calls accepted by the user), positional information including locations frequented by the user and an amount of time spent at each location, and so on. The collected data may be transferred by application 1044 to External device interface 1012 over network 1060. In addition, specific user data requests may be received at mobile device 928 from in-vehicle computing system or infotainment system 909 via external device interface 1012. The specific data requests may include requests for determining where the user is geographically located, an ambient noise level and/or music genre at the user's location, an ambient weather condition (temperature, humidity, and so on) at the user's location, and so on. Mobile device application 1044 may send control instructions to components (e.g., microphone, amplifier, and so on) or other applications (e.g., navigational applications) of mobile device 928 to enable the requested data to be collected on the mobile device or requested adjustment made to the components. Mobile device application 1044 may then relay the collected information back to in-vehicle computing system or infotainment system 909.

Likewise, one or more applications 1048 may be operable on external services 1046. As an example, external services applications 1048 may be operated to aggregate and/or analyze data from multiple data sources. For example, external services applications 1048 may aggregate data from one or more social media accounts of the user, data from the in-vehicle computing system (e.g., sensor data, log files, user input, and so on), data from an internet query (e.g., weather data, POI data), and so on. The collected data may be transmitted to another device and/or analyzed by the application to determine a context of the driver, vehicle, and environment and perform an action based on the context (e.g., requesting/sending data to other devices).

Vehicle control system 1030 may include controls for controlling aspects of various vehicle systems 1031 involved in different in-vehicle functions. These may include, for example, controlling aspects of vehicle audio system 1032 for providing audio entertainment to the vehicle occupants, aspects of a climate control system 1034 for meeting the cabin cooling or heating needs of the vehicle occupants, as well as aspects of a telecommunication system 1036 for enabling vehicle occupants to establish telecommunication linkage with others.

Audio system 1032 may include one or more acoustic reproduction devices including electromagnetic transducers such as one or more speakers 1035. Vehicle audio system 1032 may be passive or active such as by including a power amplifier. In some examples, in-vehicle computing system or infotainment system 909 may be a sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 1034 may be configured to provide a comfortable environment within the cabin or passenger compartment of vehicle 902. Climate control system 1034 includes components enabling controlled ventilation such as air vents, a heater, an air conditioner, an integrated heater and air-conditioner system, and so on. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 1030 may also include controls for adjusting the settings of various vehicle control elements 1061 (or vehicle controls, or vehicle system control elements) related to the engine and/or auxiliary elements within a cabin of the vehicle, such as one or more steering wheel controls 1062 (e.g., steering wheel-mounted audio system controls, cruise controls, windshield wiper controls, headlight controls, turn signal controls, and so on), instrument panel controls, microphone(s), accelerator/brake/clutch pedals, a gear shift, door/window controls positioned in a driver or passenger door, seat controls, cabin light controls, audio system controls, cabin temperature controls, and so on. Vehicle control elements 1061 may also include internal engine and vehicle operation controls (e.g., engine controller module, actuators, valves, and so on) that are configured to receive instructions via the CAN bus of the vehicle to change operation of one or more of the engine, exhaust system, transmission, and/or other vehicle system. The control signals may also control audio output at one or more speakers 1035 of vehicle audio system 1032. For example, the control signals may adjust audio output characteristics such as volume, equalization, audio image (e.g., the configuration of the audio signals to produce audio output that appears to a user to originate from one or more defined locations), audio distribution among a plurality of speakers, and so on. Likewise, the control signals may control vents, air conditioner, and/or heater of climate control system 1034. For example, the control signals may increase delivery of cooled air to a specific section of the cabin.

Control elements positioned on an outside of a vehicle (e.g., controls for a security system) may also be connected to in-vehicle computing system or infotainment system 909, such as via inter-vehicle system communication module 1022. The control elements of vehicle control system 1030 may be physically and permanently positioned on and/or in the vehicle for receiving user input. In addition to receiving control instructions from in-vehicle computing system or infotainment system 909, vehicle control system 1030 may also receive input from one or more external devices 950 operated by the user, such as from mobile device 928. This allows aspects of vehicle systems 1031 and vehicle control elements 1061 to be controlled based on user input received from external devices 950.

In-vehicle computing system or infotainment system 909 may further include one or more antennas 1006. The in-vehicle computing system may obtain broadband wireless internet access via antennas 1006, and may further receive broadcast signals such as radio, television, weather, traffic, and the like. In-vehicle computing system or infotainment system 909 may receive positioning signals such as GPS signals via antennas 1006. The in-vehicle computing system may also receive wireless commands via radio frequency (RF) such as via antennas 1006 or via infrared or other means through appropriate receiving devices. In some embodiments, antenna 1006 may be included as part of audio system 1032 or telecommunication system 1036. Additionally, antenna 1006 may provide AM/FM radio signals to external devices 950 (such as to mobile device 928) via external device interface 1012.

One or more elements of in-vehicle computing system or infotainment system 909 may be controlled by a user via user interface 1018. User interface 1018 may include a graphical user interface presented on a touch screen, such as touch screen 908 and/or display screen 911 of FIG. 9, and/or user-actuated buttons, switches, knobs, dials, sliders, and so on. For example, user-actuated elements may include steering wheel controls, door and/or window controls, instrument panel controls, audio system settings, climate control system settings, and the like. A user may also interact with one or more applications of in-vehicle computing system or infotainment system 909 and mobile device 928 via user interface 1018. In addition to receiving a user's vehicle setting preferences on user interface 1018, vehicle settings selected by in-vehicle control system 1030 may be displayed to a user on user interface 1018. Notifications and other messages (e.g., received messages), as well as navigational assistance, may be displayed to the user on a display of the user interface. User preferences/information and/or responses to presented messages may be performed via user input to the user interface.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the vehicle systems and centralized computing resources described above with respect to FIGS. 1-8. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure provides support for a method comprising: determining whether a vehicle-to-everything (V2X) device is present within a geographical region, upon determining that the V2X device is present within the geographical region, transmitting, via one or more antennas, a first Basic Safety Message (BSM) in compliance with a regional standard governing V2X BSMs for the geographical region, and upon determining that the V2X device is not present within the geographical region, transmitting, via the one or more antennas, a second V2X BSM in compliance with a multi-regional standard governing V2X BSMs, the multi-regional standard being different than the regional standard governing V2X BSMs. In a first example of the method, the multi-regional standard governing V2X BSMs establishes a V2X BSM format including a set of position indicators and a set of vehicle dynamics indicators. In a second example of the method, optionally including the first example, the set of position indicators includes a latitude indicator, a longitude indicator, and an elevation indicator, and wherein the set of vehicle dynamics indicators includes one or more of a speed indicator, a heading indicator, a brake-light status indicator, an indicator-light status indicator, and an emergency-light status indicator. In a third example of the method, optionally including one or both of the first and second examples, the method further comprises: receiving a third V2X BSM in compliance with the multi-regional standard governing BSMs. In a fourth example of the method, optionally including one or more or each of the first through third examples, the method further comprises: in response to receiving the third V2X BSM in compliance with the multi-regional standard governing V2X BSMs, transmitting a fourth V2X BSM in compliance with the multi-regional standard governing V2X BSMs, the fourth V2X BSM including a local Road Side Unit (RSU) request indicator. In a fifth example of the method, optionally including one or more or each of the first through fourth examples, the method further comprises: receiving a fifth V2X BSM in compliance with the multi-regional standard governing BSMs, the fifth V2X BSM including a set of RSU indicators. In a sixth example of the method, optionally including one or more or each of the first through fifth examples, the set of RSU indicators includes one or more of: a traffic light indicator, a signal indicator, a speed indicator, a mapping (MAP) message indicator, a Signal Phase and Timing (SPaT) message indicator, and a Traveler Information Message (TIM) message indicator. In a seventh example of the method, optionally including one or more or each of the first through sixth examples, a frequency range specified for V2X BSMs in compliance with the regional standard governing V2X BSMs is different from the frequency range specified for V2X BSMs in compliance with the multi-regional standard governing V2X BSMs. In an eighth example of the method, optionally including one or more or each of the first through seventh examples, a bandwidth range specified for V2X BSMs in compliance with the regional standard governing V2X BSMs is different from a bandwidth range specified for V2X BSMs in compliance with the multi-regional standard governing V2X BSMs.

The disclosure also provides support for a method comprising: establishing that a vehicle-to-everything (V2X) device is present within a geographical region, receiving, via one or more antennas, a first V2X Basic Safety Message (BSM) in compliance with a multi-regional standard governing V2X BSMs, the multi-regional standard governing V2X BSMs being different than a regional standard governing V2X BSMs for the geographical region, and in response to receiving the first V2X BSM in compliance with the multi-regional standard governing V2X BSMs, transmitting, via the one or more antennas, a second V2X BSM in compliance with the multi-regional standard governing V2X BSMs. In a first example of the method, a frequency for transmitting V2X BSM in compliance with the multi-regional standard governing V2X BSMs is less than a frequency for transmitting V2X BSM in compliance with the regional standard governing V2X BSMs. In a second example of the method, optionally including the first example, the V2X device is installed in a vehicle. In a third example of the method, optionally including one or both of the first and second examples, the multi-regional standard governing V2X BSMs establishes a V2X BSM format including a set of position indicators and a set of vehicle dynamics indicators, wherein the set of position indicators includes a latitude indicator, a longitude indicator, and an elevation indicator, and wherein the set of vehicle dynamics indicators includes one or more of a speed indicator, a heading indicator, a brake-light status indicator, an indicator-light status indicator, and an emergency-light status indicator. In a fourth example of the method, optionally including one or more or each of the first through third examples, the method further comprises: receiving a third V2X BSM in compliance with the multi-regional standard governing V2X BSMs, the third V2X BSM including a local Road Side Unit (RSU) request indicator, and in response to receiving the local RSU request indicator, transmitting a fourth V2X BSM in compliance with the multi-regional standard governing V2X BSMs, the fourth V2X BSM including a set of RSU indicators. In a fifth example of the method, optionally including one or more or each of the first through fourth examples, the set of RSU indicators includes one or more of: a traffic light indicator, a signal indicator, a speed indicator, a mapping (MAP) message indicator, a Signal Phase and Timing (SPaT) message indicator, and a Traveler Information Message (TIM) message indicator.

The disclosure also provides support for a method for establishing a minimum-event navigational route, comprising: requesting, via one or more antennas, a minimum-event evaluation of a navigational route from a Road Side Unit (RSU) having a coverage region, the navigational route having a start point within the coverage region and an end point beyond the coverage region, receiving, via the one or more antennas, an indicator carrying one of: a confirmation that the navigational route is a minimum-event navigational route, and a suggested alternative navigational route, upon the indicator carrying an alternative navigational route, providing the suggested alternative navigational route to a navigational device of the vehicle, and upon the indicator carrying the alternative navigational route, retaining the suggested alternative navigational route at the navigational device of the vehicle between a time the vehicle exists the coverage region and a time the vehicle arrives at the end point, wherein the alternative navigational route is a minimum-event route between the start point and the end point. In a first example of the method, the method further comprises: upon the indicator carrying the alternative navigational route, displaying the navigational route on a display of the vehicle between the time the vehicle exits the coverage region and the time the vehicle arrives at the end point. In a second example of the method, optionally including the first example, the events of the minimum-event route include events reported through Basic Safety Messages (BSMs) for a plurality of available routes between the start point and the end point. In a third example of the method, optionally including one or both of the first and second examples, the events of the minimum-event route include at least one of: reported collisions for the plurality of available routes, and reported criminal activity for the plurality of available routes. In a fourth example of the method, optionally including one or more or each of the first through third examples, the RSU is in communication with one or more centralized processors for serving minimum-event routes for vehicle navigation, wherein the one or more centralized processors are in communication with a plurality of additional RSUs, and wherein the RSU receives the alternative navigational route from the one or more centralized processors.

As used herein, the term "approximately" is construed to mean plus or minus five percent of the range unless otherwise specified.

As used herein, the terms "substantially the same as" or "substantially similar to" are construed to mean the same as with a tolerance for variation that a person of ordinary skill in the art would recognize as being reasonable.

As used herein, an element or step recited in the singular and proceeded with the word "a" or "an" should be understood as not excluding plural of said elements or steps, unless such exclusion is stated.

As used herein, references to "one embodiment" or "one example" of the present disclosure are not intended to be interpreted as excluding the existence of additional embodiments that also incorporate the recited features.

As used herein, terms such as "first," "second," "third," and so on are used merely as labels, and are not intended to impose any numerical requirements, any particular positional order, or any sort of implied significance on their objects.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments.

As used herein, terminology in which elements are presented in a list using "and/or" language means any combination of the listed elements. For example, "A, B, and/or C" may mean any of the following: A alone; B alone; C alone; A and B; A and C; B and C; or A, B, and C.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   operating with a vehicle-to-everything (V2X) device of a vehicle present within a first geographical region;
   in response to the V2X device of the vehicle present within the first geographical region, transmitting, via one or more antennas of the vehicle, a first Basic Safety Message (BSM) having a first format in compliance with a regional standard governing V2X BSMs for the first geographical region;
   operating with the V2X device of the vehicle within a second geographical region that is not within the first geographical region; and
   in response to the V2X device of the vehicle present within the second geographical region that is not within the first geographical region, transmitting, via the one or more antennas of the vehicle, a second V2X BSM having a second format in compliance with a multi-regional standard governing V2X BSMs, the multi-regional standard encompassing both the first geographical region and the second geographical region, the multi-regional standard being different than the regional standard governing V2X BSMs, and the first format being different than the second format;
   wherein a rate for transmitting V2X BSMs in compliance with the multi-regional standard governing V2X BSMs relative to a rate for transmitting V2X BSMs in compliance with the regional standard governing V2X BSMs is reduced based on one or more of: current traffic conditions; heavy V2X radio signaling conditions; and heavy V2X communication.

2. The method of claim 1,
   wherein the multi-regional standard governing V2X BSMs establishes a V2X BSM format including a set of position indicators and a set of vehicle dynamics indicators.

3. The method of claim 2,
   wherein the set of position indicators includes a latitude indicator, a longitude indicator, and an elevation indicator; and
   wherein the set of vehicle dynamics indicators includes one or more of a speed indicator, a heading indicator, a brake-light status indicator, an indicator-light status indicator, and an emergency-light status indicator.

4. The method of claim 1, further comprising:
   receiving a third V2X BSM in compliance with the multi-regional standard governing BSMs.

5. The method of claim 4, further comprising:
   in response to receiving the third V2X BSM in compliance with the multi-regional standard governing V2X BSMs, transmitting a fourth V2X BSM in compliance with the multi-regional standard governing V2X BSMs, the fourth V2X BSM including a local Road Side Unit (RSU) request indicator.

6. The method of claim 5, further comprising:
receiving a fifth V2X BSM in compliance with the multi-regional standard governing BSMs, the fifth V2X BSM including a set of RSU indicators.

7. The method of claim 6,
wherein the set of RSU indicators includes one or more of: a traffic light indicator; a signal indicator; a speed indicator; a mapping (MAP) message indicator; a Signal Phase and Timing (SPaT) message indicator; and a Traveler Information Message (TIM) message indicator.

8. The method of claim 1,
wherein a frequency range specified for V2X BSMs in compliance with the regional standard governing V2X BSMs is different from the frequency range specified for V2X BSMs in compliance with the multi-regional standard governing V2X BSMs; and
wherein a rate for transmitting V2X BSMs in compliance with the multi-regional standard governing V2X BSMs is approximately one-tenth of a rate for transmitting V2X BSMs in compliance with the regional standard governing V2X BSMs.

9. The method of claim 1,
wherein a bandwidth range specified for V2X BSMs in compliance with the regional standard governing V2X BSMs is different from a bandwidth range specified for V2X BSMs in compliance with the multi-regional standard governing V2X BSMs.

10. A method comprising:
operating with a vehicle to everything (V2X) device of a vehicle present within a geographical region;
receiving, via one or more antennas of the vehicle, a first V2X Basic Safety Message (BSM) in compliance with a multi-regional standard governing V2X BSMs, the multi-regional standard governing V2X BSMs being different than a regional standard governing V2X BSMs for the geographical region, and a format of V2X BSMs in compliance with the multi-regional standard governing V2X BSMs being different than a format of V2X BSMs in compliance with the regional standard governing V2X BSMs; and
in response to receiving the first V2X BSM in compliance with the multi-regional standard governing V2X BSMs, transmitting, via the one or more antennas, a second V2X BSM in compliance with the multi-regional standard governing V2X BSMs,
wherein a rate for transmitting V2X BSMs in compliance with the multi-regional standard governing V2X BSMs is less than a rate for transmitting V2X BSMs in compliance with the regional standard governing V2X BSMs;
wherein the rate for transmitting V2X BSMs in compliance with the multi-regional standard governing V2X BSMs relative to the rate for transmitting V2X BSMs in compliance with the regional standard governing V2X BSMs is reduced based on one or more of: current traffic conditions; heavy V2X radio signaling conditions; and heavy V2X communication.

11. The method of claim 10,
wherein the rate for transmitting V2X BSM in compliance with the multi-regional standard governing V2X BSMs is approximately one-tenth of the rate for transmitting V2X BSM in compliance with the regional standard governing V2X BSMs.

12. The method of claim 10,
wherein the multi-regional standard governing V2X BSMs establishes a V2X BSM format including a set of position indicators and a set of vehicle dynamics indicators;
wherein the set of position indicators includes a latitude indicator, a longitude indicator, and an elevation indicator; and
wherein the set of vehicle dynamics indicators includes one or more of a speed indicator, a heading indicator, a brake-light status indicator, an indicator-light status indicator, and an emergency-light status indicator.

13. The method of claim 10, further comprising:
receiving a third V2X BSM in compliance with the multi-regional standard governing V2X BSMs, the third V2X BSM including a local Road Side Unit (RSU) request indicator; and
in response to receiving the local RSU request indicator, transmitting a fourth V2X BSM in compliance with the multi-regional standard governing V2X BSMs, the fourth V2X BSM including a set of RSU indicators.

14. The method of claim 13,
wherein the set of RSU indicators includes one or more of: a traffic light indicator; a signal indicator; a speed indicator; a mapping (MAP) message indicator; a Signal Phase and Timing (SPaT) message indicator; and a Traveler Information Message (TIM) message indicator.

* * * * *